UNITED STATES PATENT OFFICE.

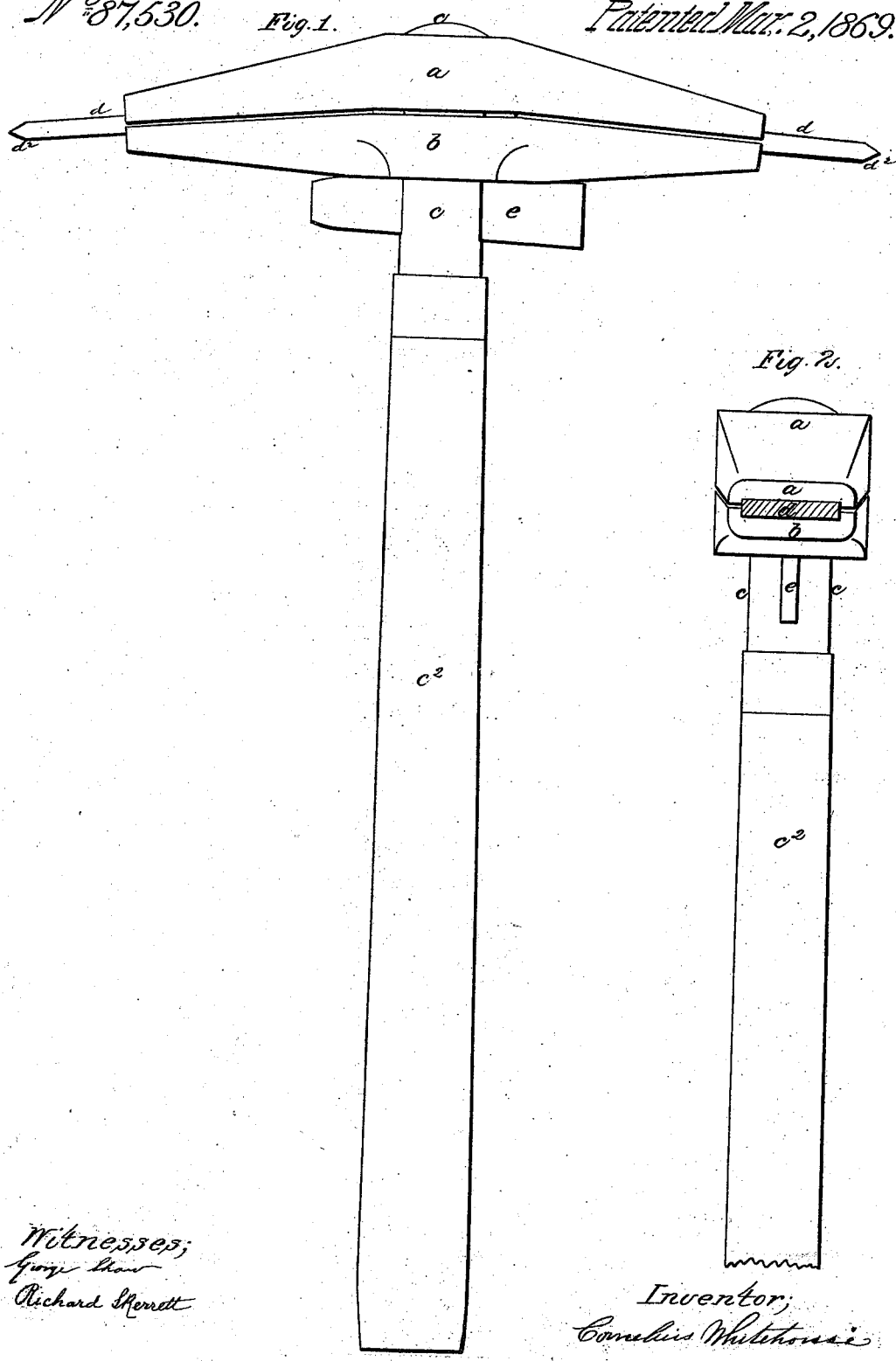

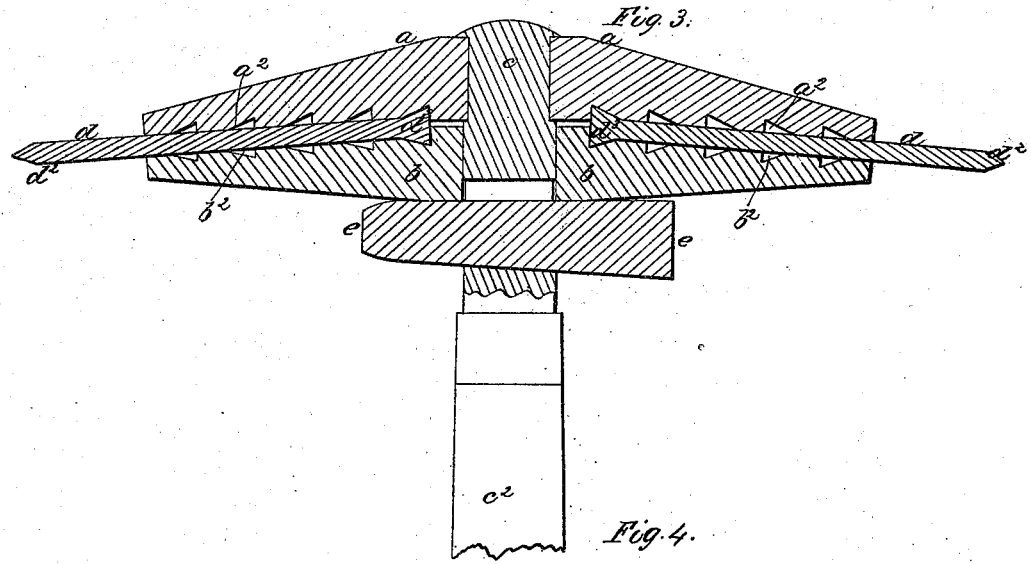
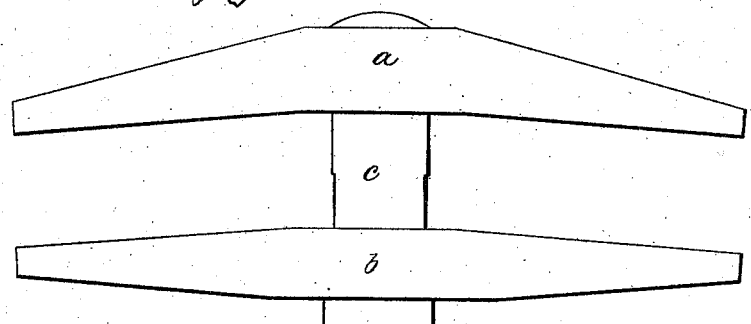
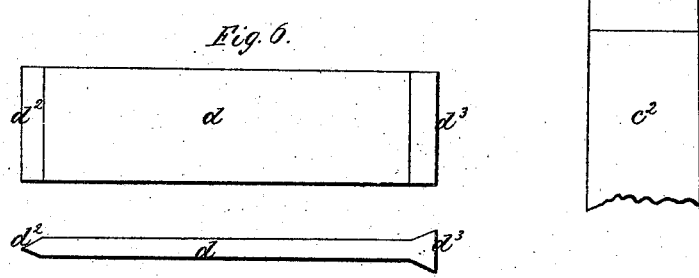
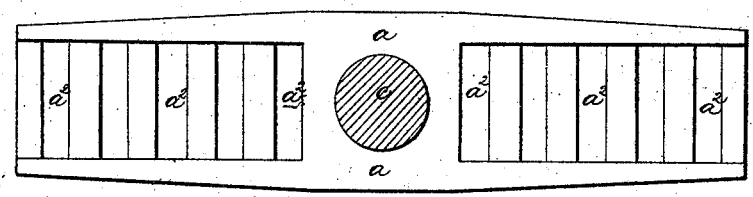

CORNELIUS WHITEHOUSE, OF BRIDGTOWN, NEAR CANNOCK, ENGLAND.

Letters Patent No. 87,530, dated March 2, 1869.

IMPROVED PICK FOR DRESSING MILLSTONES.

The Schedule referred to in these Letters Patent and making part of the same.

*To all to whom it may concern:*

Be it known that I, CORNELIUS WHITEHOUSE, of Bridgtown, near Cannock, in the county of Stafford, England, edge-tool and auger-maker, a subject of the Queen of Great Britain, have invented certain new and useful "Improvements in Mill-Bills and Picks for Dressing Millstones, and for Dressing Stone for other purposes;" and I, the said CORNELIUS WHITEHOUSE, do hereby declare the nature of the said invention, and in what manner the same is to be performed, to be particularly described and ascertained in and by the following statement thereof; that is to say—

Mill-bills for dressing millstones, as ordinarily constructed, consist of a head made of steel, the said head having a wooden handle. Each end of the head is ground to a sharp chisel-edge. After the edges have been worn by use, the ends require to be drawn out by a smith, and rehardened and ground. This requires to be done repeatedly, and is not only troublesome and expensive, but frequently results in injury to the steel, and consequent imperfection in the implement.

In making mill-bills according to my invention, I make the ends, or acting-portions, separate from the head. I make the said ends of flat bars of steel, the acting-end being ground to a chisel-edge, and the other end having an enlargement or head upon it.

These chisel-ends are inserted and fixed in the head, or frame of the mill-bill in the following manner:

The said head, or frame of the bill is nearly of the ordinary form, but is made hollow, and divided, in the direction of its length, in a plane at right angles to the handle.

The top half of the head, or frame is fixed to the handle, and the other half is capable of sliding on the handle, so as to be brought in contact with or separated from the other half.

In fixing the chisel-ends in the bill-head, or frame, the two parts of the head, or frame are separated, and the chisel-ends are placed between them, so that their acting-ends project about an inch from the head, or frame. The movable part of the head, or frame is then closed upon the fixed part, and secured in its place by a wedge passed through the handle, the chisel-ends being fixed, griped, and held, between the two parts of the head, or frame.

The inner faces of the two parts of the head, or frame are provided with notches, into which the enlargements, or heads on the chisel-ends fit, and which prevent the said ends being forced during use into the head, or frame of the bill.

When the chisel-edges of the ends are worn, they are removed from the head, or frame of the bill, by unwedging the movable part, and by simply grinding them they are restored to a proper working-condition, no heating, forging, and hardening of the ends being necessary.

Instead of fixing the movable part of the head, or frame by means of a wedge, it may be fixed by a screw or otherwise.

In making mill and other picks according to my invention, I substitute flat bars of steel, having points instead of chisel-edges.

Bills and picks made according to my invention may also be employed for dressing stone for various purposes.

Having explained the nature of my invention, I will proceed to describe, with reference to the accompanying drawings, the manner in which the same is to be performed.

Figure 1 represents, in elevation, a mill-bill for dressing millstones, constructed according to my invention, and Figure 2 is an end elevation of the same.

Figure 3 is a longitudinal section of the same, the handle being broken off.

Figure 4 represents the two parts of the head of the bill, separated, and

Figure 5 represents a plan of the inner side of the fixed half of the bill-head, or frame.

Figure 6 represents one of the chisel-ends of the bill separately.

The same letters of reference indicate the same parts in each figure of the drawing.

$a\ b$ are the two parts, or halves of the bill-head, or frame, the top part or half $a$ of which is fixed to the metallic end $c$ of the handle $c^2$, and the bottom part or half $b$ of which is capable of sliding on the part $c$ of the handle, so as to be brought in contact with or separated from the top half, $a$.

The said halves $a\ b$ are hollow, so that when they are brought together, a space is left, of a size proper to receive the separate chisel-ends $d\ d$.

These chisel-ends are made of flat bars of steel, having a chisel-edge, $d^2$, on one end, and an enlargement, or head, $d^3$, on the other end. The shape of the separate chisel-ends, or acting-parts of the bill-head, or frame will be best seen by referring to the detached view of a chisel-end, fig. 6.

The inner faces of the two parts $a\ b$ of the bill-head, or frame, are provided with notches, marked $a^2\ b^2$, into which the enlargements, or heads, $d^3$, of the chisel-ends are fitted, as represented in fig. 3.

In fixing the chisel-ends $d\ d$ in the bill-head, or frame, the two parts $a\ b$ are separated, as illustrated in fig. 4, and the chisel-ends $d\ d$ are placed between them, so that they project about an inch from the head, the enlargements, or heads, $d^3$, of the chisel-ends being dropped into the notches of one or other of the parts $a\ b$.

The movable part $b$ of the head, or frame, is then closed upon the fixed part $a$, and the said part $b$ is secured in its place by a wedge, $e$, passed through the handle $c$, as illustrated in figs. 1 and 3, or by a screw, or other equivalent means.

By the closing of the movable part $b$ upon the fixed part $a$, the chisel-ends $d\ d$ are fixed in the notches $a^2\ b^2$, and the flat parts of the chisel-ends are griped, and firmly held throughout their length between the two parts $a\ b$, and the mill-bill is ready for use, the chisel-ends being prevented from being forced inward by the notches, into which their heads are fitted.

When the acting-edges of the chisel-ends $d\ d$ are worn, the said chisel-ends are removed from the head $a\ b$, by withdrawing the wedge $e$, and sliding the movable part $b$ into the position represented in fig. 4, when, by simply grinding the edges of the chisel-ends, they are again ready to be refixed and used in the mill-bill.

As the chisel-ends shorten by wear, and by the grinding, their heads $d^3$ are dropped into notches nearer to the points of the bill-head, or frame, so as to make the chisel-ends project the required distance from the said bill-head, or frame.

By substituting flat bars of steel, having points, for the bars having chisel-ends, represented in the drawing, the bill is converted into a mill or other pick.

It will be noticed, that by making the lower jaw of the head capable of sliding upon the handle, the adjustment of this jaw is effected with much greater ease than has heretofore been practicable, and that the chisel-ends inserted between the jaws are griped, and held throughout their entire length, thus assuring the steadiness of the acting-ends.

Having now described the nature of my invention, and the manner in which the same is to be performed, I wish it to be understood that I do not claim broadly a mill-bill composed of a divided head, with detached chisel, or acting-ends, for I am aware that such tools have been heretofore used; but

What I do claim, and desire to secure by Letters Patent, is—

A mill-bill, or pick, for dressing stone, the head, or frame, of which is composed of two parts, the one fixed, the other movable, and sliding upon the handle, the said parts being notched and constructed to gripe and be in contact with that portion of the removable chisel, or acting-ends, placed between them, substantially as and for the purposes shown and set forth.

CORNELIUS WHITEHOUSE. [L. S.]

Witnesses:
GEORGE SHAW,
7 *Cannon Street, Birmingham.*
RICHARD SKERRETT,
7 *Cannon Street, Birmingham.*